Patented Dec. 17, 1940

2,225,246

UNITED STATES PATENT OFFICE 2,225,246

METHOD OF PRODUCING A RESIN ACID LACTONE

Torsten Hasselstrom, Savannah, Ga., assignor to G & A Laboratories, Inc., Savannah, Ga., a corporation of Georgia No Drawing. Application February 28, 1939, Serial No. 258,955

7 Claims. (Cl. 260—97)

This invention relates to a method of producing a resin acid lactone from rosin acids containing dihydroabietic acid.

It is the object of this invention to provide a method of producing a resin acid lactone belonging to the tetrahydroresin acid series of hydrogenated rosin derivatives.

The preparation of a resin acid lactone in accordance with this invention is carried out by treating a rosin acid containing dihydroabietic acid as one of its constituents with sulfuric acid under the usual conditions of sulfonating such rosin acids to produce the sulfonate. The rosin acids containing dihydroabietic acid useful in this invention also contain dehydroabietic acid to a greater or less extent. By treatment of the rosin acid with sulfuric acid under the usual conditions of sulfonation, the dehydroabietic acid content of the particular rosin acid undergoes sulfonation with the formation of the dehydroabietic acid sulfonate. The dihydroabietic acid content of the particular rosin acid, on the other hand, undergoes hydration by the action of the sulfuric acid with the formation of the lactone of hydroxytetrahydroabietic acid.

The rosin acids containing dihydroabietic acid which have been found useful in the process of this invention are for example, heat treated wood rosin, pseudopimaric acid, "Hyex" wood rosin, hydrogenated wood rosin, etc.

The heat treated rosin may be the so-called pyroabietic acid known to contain a mixture of dehydroabietic acid and hydrogenated abietic acids, some of the latter being in the form of dihydroabietic acid, or it may be any other heat treated rosin containing dihydroabietic acid as one of its constituents. The pseudopimaric acid useful in the process is hereby defined as the product prepared in accordance with the process disclosed in United States Letters Patent No. 2,072,628, and known to consist essentially of a mixture of dehydroabietic acid and dihydroabietic acid. The "Hyex" rosin useful in the process is hereby defined as the rosin acid prepared in accordance with the process disclosed in application for United States Letters Patent, Serial No. 6,403, filed February 13, 1935, refiled June 12, 1936, Serial No. 84,877, for Process for the treatment of abietyl compounds and products produced thereby, now U. S. Patent No. 2,154,629, which disclose treatment of compounds containing the hydrocarbon nucleus of abietic acid so as to decrease their apparent unsaturated character and possibly increase their melting points and improve their color, and also discloses treated products so formed. Said treatment comprises contacting the abietyl compound with a catalyst, hereinafter defined, in a manner adapted to exclude the possibility of reaction between the abietyl compound and any other material. As a result of such treatment, a change in the chemical and physical properties of the abietyl compound, believed to be due to a simultaneous dehydrogenation and hydrogenation by the heating of the abietyl compound, in the presence of the hydrogenation catalyst only, takes place and the resulting product has a greatly decreased apparent color.

The catalysts which may be used in effecting this intra- or intermolecular rearrangement are those which catalyze hydrogenation of unsaturated compounds, e. g., any of the nickel, platinum, palladium or copper chromite catalysts used in such hydrogenation. The "Hyex" rosin is known to contain appreciable quantities of dehydroabietic acid and dihydroabietic acid. The hydrogenated wood rosin may be the product of rosin hydrogenation and will preferably be saturated to the extent of 50 to 75 per cent of the double bonds of the original rosin.

The method of producing the resin acid lactone in accordance with this invention involves the treatment of the rosin acid containing dihydroabietic acid with concentrated sulfuric acid, for example, of specific gravity 1.84, at a temperature in the range of about —5° C. to about +50° C. to effect hydration of the dihydroabietic acid contained in the rosin acid to a resin acid lactone of the tetrahydroresin acid series of hydrogenated rosin derivatives. The dehydroabietic acid contained in the rosin acid undergoes sulfonation to a dehydroabietic acid sulfonate. Separation of the resin acid lactone from the dehydroabietic acid sulfonate or other sulfonated material is effected by treatment of the reaction product with aqueous alkali, which saponifies the sulfonated material but does not affect the resin acid lactone.

In carrying out the process in accordance with this invention the product obtained by treatment of the rosin acid containing dihydroabietic acid with concentrated sulfuric acid is poured onto cracked ice, the brownish precipitate filtered out, washed with cold water, extracted by hot water, leaving a brownish, insoluble, semi-solid resin. This resin is subjected to an aqueous alkali treatment, for example, by treatment with alkali hydroxides, such as, for example, the hydroxides of sodium, potassium, ammonium, caseium, rubidium, etc. The alkali treatment is carried out by stirring the resin with the aqeous alkali or by means of other suitable agitation, until practically complete saponification of the sulfonated material contained in the resin is accomplished, with or without the use of heat. The mixture is then allowed to stand, and the upper layer separated by decantation. The separated, insoluble constituent is extracted with a suitable solvent, such as, for example, benzene, alcohol, acetone, petroleum ether, etc., or mixtures thereof, and the solvent evaporated. The resulting product, on standing and cooling, becomes solid in part. The solid portion is removed by filtration, and purified by recrystallization, e. g., from a benzene or toluene solution thereof. The recrystallized resin acid lactone is a water-white solid having a melting-point of about 130 to 132° C. and having the approximate formula $C_{20}H_{32}O_2$.

This resin acid lactone may be purified, if desired, by fractional distillation in vacuo, separation of the solid from the liquid portion, and recrystallization from a suitable solvent.

As examples of the carrying out of the process of this invention the following are illustrative:

Example I

Fifty parts by weight of partially refined pseudopimaric acid, melting point 167–169° C.

$$(\alpha)\frac{31°}{D} = +46.3°$$

and 250 parts by weight of sulfuric acid, specific gravity 1.84, were mixed at about −5° to +5° C., stirred for about 20 minutes, then poured onto cracked ice. The brownish precipitate was filtered out, washed with cold water until the washings clouded when mixed with the original liquor, and the washed precipitate then extracted three times with boiling water, leaving a brownish, insoluble semi-solid resin. The brownish, insoluble semi-solid resin amounted to 30 parts by weight. Then 1000 grams of the brownish insoluble resin were dissolved in 5 liters of 3% aqueous sodium hydroxide solution, and the clouded, brownish solution heated under a reflux condenser for 3 hours, allowed to cool, and, after standing, the supernatant liquid decanted and an equal volume of water added, the mixture boiled, allowed to stand over night. As much of the caustic-insoluble material as could be removed by repeated dilution and decantation was so removed, and the remainder of the caustic-insoluble material was boiled with "Supercell," extracted with benzene or toluene, and this extract used to dissolve the insoluble residue, the benzene or toluene evaporated, leaving a brownish paste, which, on standing, partly solidified and separated crystals having approximately the following composition: C 80.58%, H 10.25%, and a melting point of 131–132° C.

Then 180 g. of the above paste were distilled in vacuo, as follows:

Table 1

| Fraction | Boiling point | Pressure, mm. | Yield, grams | Percent |
|---|---|---|---|---|
| 1 | 194–210 | 14 | 4 | 2.2 |
| 2 | 210–222 | 14 | 15 | 8.3 |
| 3 | 215–240 | 12 | 21 | 11.7 |
| 4 | 233–240 | 13 | 90 | 50.0 |
| 5 | 240–249 | 13 | 20 | 11.1 |
| Residue | | | 27 | 15.0 |
| Loss | | | 3 | 1.7 |

Fractions 1–4, inclusive, were a light yellow oil showing evidence of slight decomposition. Fraction 5 was a brown oil. The residue was a brown, brittle resin. On standing, fractions 2–4, inclusive, solidified almost completely.

Small amounts of a suitable solvent, e. g., such as, for example, acetone, benzene, alcohol, etc., were added to fractions 2–4, inclusive, and the solid portion removed from the liquid part by filtration, giving a solid melting at about 130° C. and containing C 79.9%, H 10.5%, showing it to comprise the resin acid lactone $C_{20}H_{32}O_2$.

Example II

Fifty parts by weight of "Hyex" rosin obtained by the treatment of I wood rosin according to the procedure described in the United States Patent application, filed June 12, 1936, Serial No. 84,877, now U. S. Patent No. 2,154,629, and 250 parts by weight of sulfuric acid, specific gravity 1.84, were mixed at about −5° to +5° C., stirred for about 20 minutes, then poured onto cracked ice. The brownish precipitate was filtered out, washed with cold water until the washings clouded when mixed with the original liquor and the washed precipitate then extracted three times with boiling water, leaving a brownish, insoluble semi-solid resin. Then 1000 grams of the brownish, isoluble semi-solid resin were dissolved in 5 liters of 3% aqueous sodium hydroxide solution, and the clouded, brownish solution heated under a reflux condenser for 3 hours, allowed to cool, and, after standing, the supernatant liquid decanted and an equal volume of water added, the mixture boiled, allowed to stand over night. As much of the caustic-insoluble material as could be removed by repeated dilution and decantation was so removed, and the remainder of the caustic-insoluble material was boiled with "Supercell," extracted with benzene or toluene, and this extract used to dissolve the insoluble residue, the benzene or toluene evaporated, leaving a brownish paste, which, on standing, partly solidified and separated crystals having approximately the following composition: C 80.58%, H 10.25%, and a melting point of 131–132° C.

Example III

Fifty parts by weight of hydrogenated wood rosin saturated to the extent of 65% of both double bonds of the abietic acid and 250 parts by weight of sulfuric acid, specific gravity 1.84, were mixed at about −5° to +5° C., stirred for about 20 minutes then poured onto cracked ice, the brownish precipitate was filtered out, washed with cold water until the washings clouded when mixed with the original liquor and the washed precipitate extracted 3 times with boiling water, leaving a brownish insoluble semi-solid resin, amounting to 40 parts by weight. Then 1000 grams of the brownish insoluble semi-solid resin were dissolved in 5 liters of 3% aqueous sodium hydroxide solution, and the clouded, brownish solution heated under a reflux condenser for 3 hours, allowed to cool, and, after standing, the supernatant liquid decanted and an equal volume of water added, the mixture boiled, allowed to stand over night. As much of the caustic-insoluble material as could be removed by repeated dilution and decantation was so removed, and the remainder of the caustic-insoluble material was boiled with "Supercell," extracted with benzene or toluene, and this extract used to dissolve the insoluble residue, the benzene or toluene evaporated, leaving a brownish paste, which, on standing, partly solidified and separated crystals having approximately the following composition: C 80.58%, H 10.25%, and a melting point of 131–132° C.

While in the above examples, the use of a 3% aqueous solution of sodium hydroxide is specifically disclosed for dissolving the sulfonated pseudopimaric acid, "Hyex" rosin or hydrogenated rosin, it will be appreciated that I may use a wide range of concentrations of sodium hydroxide or of other alkaline materials, such as, for example, potassium hydroxide, sodium carbonate, potassium carbonate, etc., and that my invention is not limited to the use of a 3% aqueous solution of sodium hydroxide.

It will also be appreciated that the "Supercell" which I use in these examples functions as an aid to the filtration on extraction, and may be recovered and re-used after the removal of the neutral constituents by extraction or otherwise. It will also be appreciated that I may use other filter aids equivalent to "Supercell" for this purpose.

It will be understood that the lactone obtained in Examples 2 and 3 above are presumably the same lactone obtained and described in Example 1. It will also be appreciated that the method of purification by fractional distillation may likewise be applied to the lactone produced in Examples 2 and 3.

In proceeding in accordance with this invention, I may also obtain a valuable resin from the alkaline solution which I separate from the neutral fraction containing my new lactone. I accomplish this by treating the alkaline solution with a suitable acid to neutralize the alkali, whereupon the resinous material precipitates from its solution. This resinous material, after separation from the solution, washing free of alkali and being fused, has the very high melting point of 110° C. It also has the particularly valuable property of stability against crystallization from solutions of its solvents, such as, for example, alcohol, hydrocarbons, ketones, esters, etc.

My resin acid lactone is variously useful in the preparation of varnishes and as a plasticizer where hydrogenated derivatives of resin acids are useful, as a raw material for the preparation of hydroxy acids, adhesives, etc.

The product in accordance with this invention possesses superior properties as to stability toward atmospheric conditions, as compared to natural rosin, is economical to prepare, as compared to hydrogenated rosin derivatives, and requires no complicated isolation, being obtainable by a very simple process of extraction and distillation.

The clear, alkali solutions obtained in my process of digestion of the brownish, insoluble residue from sulfonation, are useful as an emulsifying agent for rosin, hydrogenated rosin, rosin size, and other purposes where a stable emulsification is required.

It will be understood that the details and examples hereinbefore set forth are illustrative only and that the invention as broadly described and claimed is in no way limited thereby.

This application is a continuation-in-part of my application for United States Patent, Serial No. 208,854, filed May 19, 1938 on "Resin acid lactone and method of producing".

What I claim and desire to protect by Letters Patent is:

1. Process of producing a resin acid lactone which includes sulfonating a rosin acid which contains dihydroabietic acid and dehydroabietic acid as constituents by treatment with concentrated sulfuric acid at a temperature within the range of about —5° C. to about 50° C. under conditions which promote sulfonation, treating the resultant product to remove sulfonation products and other water-soluble bodies therefrom, and leave an insoluble residue, treating said insoluble residue with aqueous caustic alkali, and recovering a crude resin acid lactone from the caustic insoluble residue.

2. Process of producing a resin acid lactone which includes sulfonating a rosin acid which contains dihydroabietic acid and dehydroabietic acid as constituents by treatment with concentrated sulfuric acid at a temperature within the range of about —5° C. to about 50° C. under conditions which promote sulfonation, treating the resultant product to remove sulfonation products and other water-soluble bodies therefrom, and leave an insoluble residue, treating said insoluble residue with aqueous caustic alkali to produce a second insoluble residue, dissolving said last-mentioned residue in a solvent, removing said solvent, and recovering a crude resin acid lactone from the caustic insoluble residue.

3. Process as in claim 2, characterized by the fact that the crude resin acid lactone is recrystallized from a solvent therefor to form a resin acid lactone melting at about 130–132° C.

4. Process as in claim 2 wherein the rosin acid is pseudopimaric acid.

5. Process as in claim 2 wherein the rosin acid is "Hyex" wood rosin.

6. Process as in claim 2 wherein the rosin acid is hydrogenated wood rosin containing dihydroabietic acid and dehydroabietic acid as constituents.

7. The process as in claim 2 wherein the rosin acid is a hydrogenated rosin containing dihydroabietic acid and dehydroabietic acid.

TORSTEN HASSELSTROM.